United States Patent
Ilch et al.

(10) Patent No.: US 7,476,150 B2
(45) Date of Patent: Jan. 13, 2009

(54) DEVICE AND METHOD FOR PREPARING BROCHETTES WITH PICKED-AND-PLACED FOOD

(75) Inventors: Hartmut Ilch, Kehl (DE); Joachim Schill, Kehl (DE)

(73) Assignee: MAJA-Maschinenfabrik Hermann Schill GmbH & Co. KG, Kehl-Goldscheuer (DE)

( * ) Notice: Subject to any disclaimer, the term of this patent is extended or adjusted under 35 U.S.C. 154(b) by 698 days.

(21) Appl. No.: 10/817,990

(22) Filed: Apr. 5, 2004

(65) Prior Publication Data

US 2004/0194639 A1  Oct. 7, 2004

(30) Foreign Application Priority Data

Apr. 4, 2003  (DE) ................ 103 15 619

(51) Int. Cl.
*A22B 5/00* (2006.01)
(52) U.S. Cl. ....................................... 452/198
(58) Field of Classification Search ............. None
See application file for complete search history.

(56) References Cited

U.S. PATENT DOCUMENTS

| 4,847,954 A | 7/1989 | Lapeyre |
| 5,100,366 A | 3/1992 | Castens |
| 5,740,722 A | 4/1998 | Emsens |
| 6,085,914 A * | 7/2000 | Tobaccowala et al. ....... 209/702 |
| 6,236,018 B1 * | 5/2001 | Craig et al. .................. 219/158 |
| 6,758,803 B2 * | 7/2004 | Jang ............................ 494/10 |
| 6,886,231 B2 * | 5/2005 | Lawson et al. ........... 29/407.01 |

FOREIGN PATENT DOCUMENTS

| DE | 2625739 | 12/1977 |
| DE | 2851062 | 6/1980 |
| DE | 4225580 | 1/1994 |
| DE | 4345131 | 7/1995 |
| DE | 69507155 | 6/1999 |
| DE | 10124119 | 11/2002 |
| GB | 2161294 | 1/1986 |

* cited by examiner

*Primary Examiner*—Thomas Price
(74) *Attorney, Agent, or Firm*—Orum & Roth LLC

(57) ABSTRACT

The invention proposes a device and method for the preparation of brochettes with picked-and-placed food consisting of a brochette (17) and one or more pieces of foodstuff (4). The brochette (17) is held by a brochette holder. The pieces of foodstuff (4) are picked up from a transport device (2) by ingredient grippers (5, 11, 12) and slipped onto the brochette (17) or placed in a mold, into which the brochette is subsequently introduced.

21 Claims, 4 Drawing Sheets

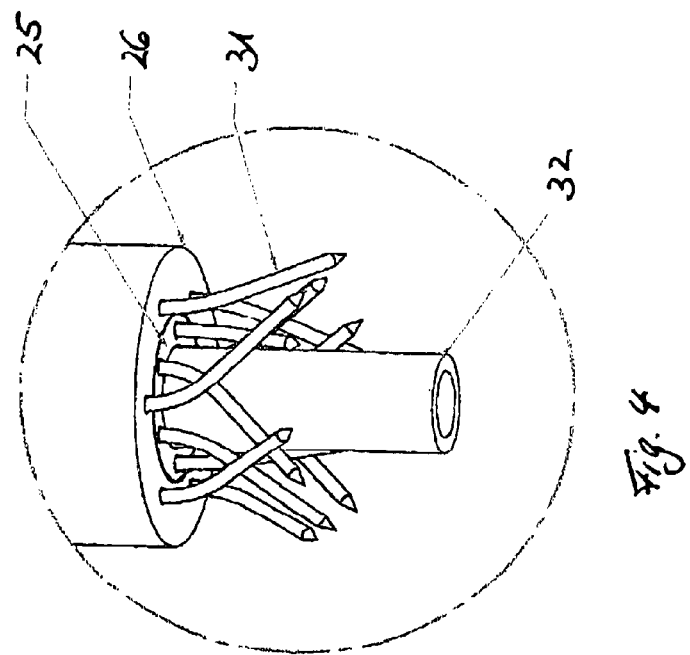
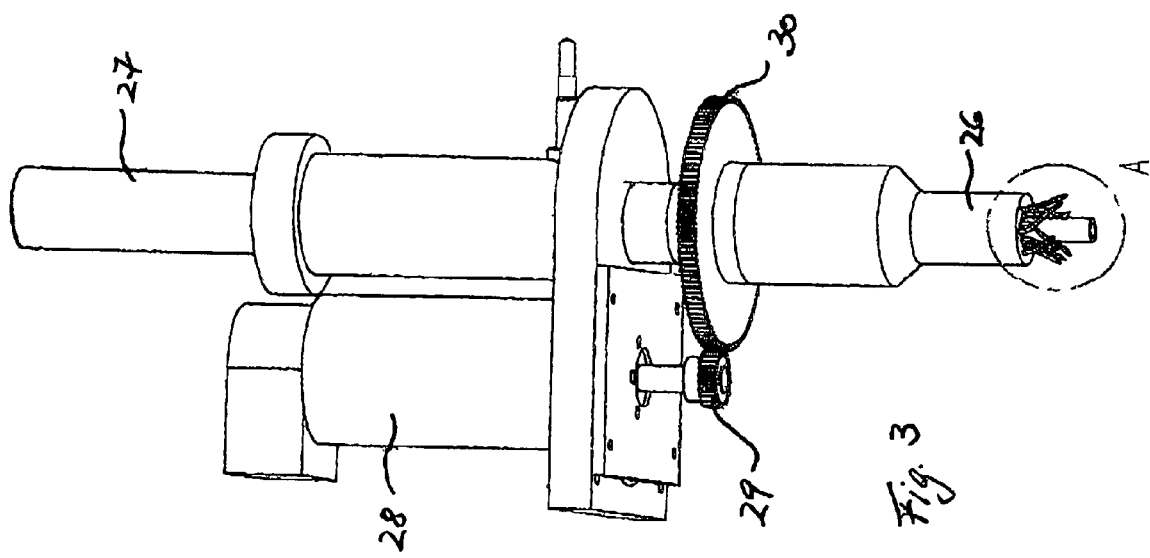

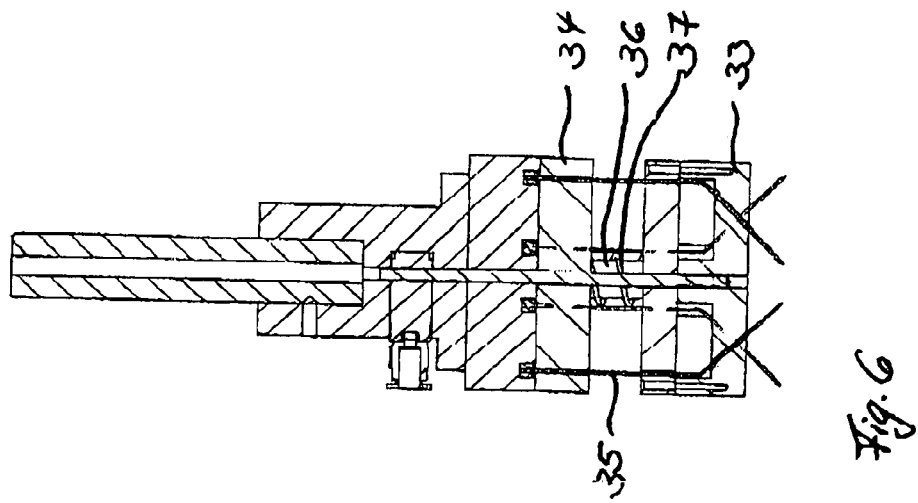
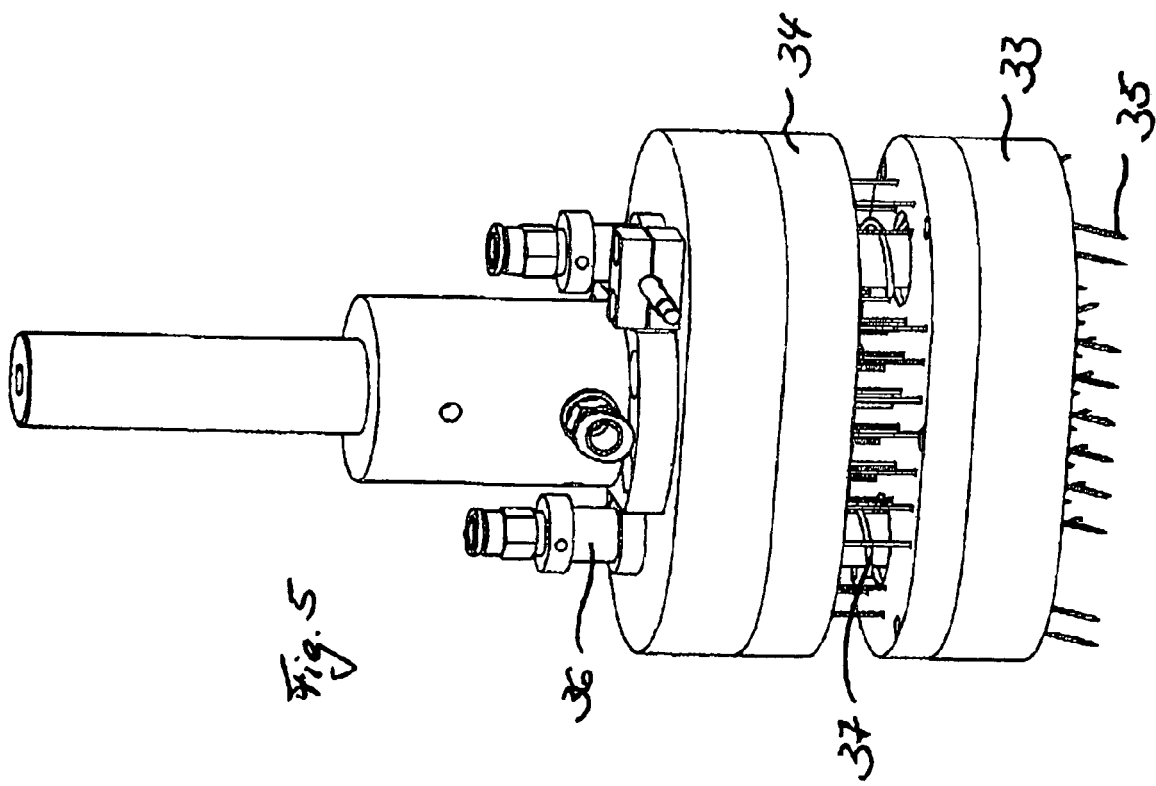

DEVICE AND METHOD FOR PREPARING BROCHETTES WITH PICKED-AND-PLACED FOOD

Applicant claims priority of Application number 103 15 619.4 filed on 4 Apr. 2003 filed with the German Patent and Trademark Office.

BACKGROUND OF THE INVENTION

1. Field of the Invention

The present invention relates to a method and a device to prepare brochettes with picked-and-placed food batches according to the characterizing clause of claims 1 and 7.

2. Description of the Prior Art

The state of the art in DE 101 24 119 A1 discloses a device for preparing shashlik-type brochette meals that comprises multiple placing discs or placing bands. These are equipped with a number of placing cells. As soon as a number of placing cells filled with ingredients are arranged in a row, a brochette is pushed through the placing cells. Thus the individual ingredients placed in the cells are speared on the brochette. The disadvantage of this state of the art is that the placing cells need to be filled manually. In addition, only a few types of ingredients, such as meat or green pepper, can be processed. Moreover, the finished brochette meal has a characteristic appearance with contours of a cuboid. Thus, the consumer immediately recognizes that the brochette meal has been prepared, at least partially, by a machine. However, those who prepare and sell this type of meals consider this aspect undesirable.

The state of the art in DE 69507 155 T2 discloses a machine for automatic preparation of meat and/or vegetable brochette meals. Recesses of a rectangular form are provided to receive the individual ingredients. The dimensions of the recesses correspond with the desired dimensions of the finished brochette meal. The recesses are completely filled with ingredients. Subsequently, through a pipe, a brochette is introduced into the ingredients placed in the recesses. The disadvantage of this state of the art is that pieces of ingredients that fill the recesses in cross-section only partially are speared by the brochette only at their edge or are not speared at all. The recesses must be filled with ingredients manually. In addition, the ingredients are placed on the brochette so close to each other that they touch each other. Since the raw meals ready for skewering are not immediately prepared and eaten but rather stored, the fact that the individual ingredients touch each other is undesirable.

SUMMARY OF THE INVENTION

In contrast, the method and the devices designed according to the features of claims 1 and 7 have the advantage that the manual filling process is eliminated. The preparation occurs completely by a machine. In spite of this, the brochette meals look as if they had been prepared manually. Any type of meat, vegetable, fruit or pieces of any other foodstuff in the form of cubes, slices or stripes can be used as ingredients. The spearing of the pieces of ingredients on the brochette occurs at the desired spot. In order to prepare shashlik-type of meals, or brochette fruit or vegetable meals, several pieces of ingredients, mostly in the form of a cube, are placed onto the brochette. To prepare a lomo or sate brochette meal, using a gripper a stripe of meat is placed into A mold, and the brochette is then introduced into the form through the mold. The mold has a wavy shape so that the meat is speared on the brochette in a wave-like shape, too. The pieces of ingredients can be optionally speared either with a distance from each other or close to each other.

A brochette holder is provided to retain the brochette. In addition, the brochette can be held or moved by a brochette gripper. The brochette can be oriented vertically, horizontally or at an angle. Holding the brochette at its two opposite ends ensures that during the insertion of the pieces of ingredients the brochette cannot break. The breaking of the brochette can be also excluded, when the forces exerted due to the geometry of the pieces of ingredients do not act in the axial direction of the brochette.

A suitable retainer for the blunt end of the brochette is, for example, a recess corresponding with the diameter of the brochette, into which the brochette is inserted. If using a transport device, the recess is moved, the supply of brochettes to be filled and the removal of filled brochettes can occur without any additional means.

The ingredients are grabbed by a gripper from a tray. The filling of the brochette with ingredients is performed also with the ingredient grippers. There are two possibilities: Either all or several ingredients for the same brochette are grabbed and subsequently placed onto the brochette by -several ingredient grippers, or one ingredient grabs one piece of ingredient, places it on the brochette and then grabs again another piece of ingredient.

According to an advantageous embodiment of the invented method, in order to place a piece of ingredient, for example, a piece of meat onto the brochette, the ingredient gripper grabs the piece of ingredient and places it at the sharp end of the brochette. As soon as the sharp end of the brochette penetrated the piece of ingredient, the brochette gripper opens and releases the sharp end of the brochette. Now, the ingredient gripper can, unrestricted, push the piece of ingredient in the direction towards the blunt end of the brochette. A recess or an aperture in the fingers of the ingredient gripper ensures that the sharp end of the brochette can move through the fingers. The brochette gripper subsequently closes and thus again fixes the brochette in the area of its sharp end. Now, the ingredient gripper opens and releases the piece of ingredient arranged at the pre-determined position. Now, the next piece of ingredient can be picked up and placed on the brochette. This can occur in the described manner, but there is another possibility to introduce the next piece of ingredient, for example, a piece of onion or green pepper, by the ingredient gripper only so far onto the sharp end of the brochette that it does not fall off after the ingredient gripper opens. However, the brochette gripper does not open and the ingredient gripper does not immediately shift the piece of ingredient into the desired position. Now, the third piece of ingredient, for example, another piece of meat, is introduced onto the brochette in the above-described way. During this operation, the second piece of ingredient automatically shifts into its desired position. If a certain distance is desired between the individual pieces of ingredients, after the positioning of the second piece of ingredient, the third piece of ingredient must be withdrawn by a distance equal to the desired gap between the second and the third pieces of ingredient. The shifting of the pieces of ingredients is repeated so many times until the entire brochette is filled with the pre-determined number of pieces. When the process is completed, the finished raw brochette is removed. For this purpose, the raw brochette is, for example, put on a conveying belt or into a package.

The individual pieces of ingredients are either supplied on a tray so that the ingredient grippers can pick them up always from approximately the same place, or they are supplied by a conveying device in any desired order. The position and, if need be, also the orientation of the pieces of ingredients is determined by means of an optical sensor, for example, a camera and an image processing unit, and transmitted to a control unit. This system ensures that the ingredient gripper is conveyed to the appropriate position of the piece of ingredient and picks it up in the right orientation.

A suitable device for supplying the pieces of ingredients in any desired order is, for example, a conveying belt. The pieces of ingredients can either be manually put on the conveying belt or be brought there by a machine. In this process it is important not to put the individual pieces on top of each other but rather besides each other. In order to distribute the pieces of ingredients on the conveying belt according to this requirement, a vibrating apparatus or a stripping mechanism can be provided.

A movable arm of an industrial robot or a handling device that can shift or roll in two directions can be provided to move the ingredient grippers. The ingredient grippers and the brochette grippers can be part of an industrial robot. The industrial robot is programmed to exactly follow the required procedure. The ingredient grippers are located at the ends of one or several movable arms. In an advantageous embodiment of the invented device, the arm of the industrial robot can comprise a turnable unit with a number of ingredient grippers. To pick up several pieces of ingredients, a first ingredient gripper is led to a first piece of ingredient and picks it up. Then the turnable unit is turned so that a second ingredient gripper can pick up a second piece of ingredient. This process is repeated so many times until all ingredient grippers have picked up one piece of ingredient each. Subsequently, the pieces of ingredients are slipped on the brochette one after another.

An advantageous embodiment of the invented device provides brochette grippers and ingredient grippers in the form of angular or parallel grippers. These grippers comprise fingers with jaws attached to them. With angle grippers, the fingers swivel so that during their opening and closing they contain an angle. The fingers of a parallel gripper move, parallel to each other, away from one another when they open. The jaws serve the purpose of clamping a piece of ingredient. In addition to the above-described variants, suction grippers can also be used. This type of grippers comprises a suction cup, from which air is sucked off by means of air pipes.

Another advantageous embodiment of this invention provides an ingredient gripper in the form of a needle gripper. For example, this gripper can consist of two coaxially arranged hollow cylinders with needles mounted on their front ends. In order to grab a piece of ingredient, the two hollow cylinders are turned around their common axis in opposite directions and thus moved towards the piece of the foodstuff. In this process, the needles tilted towards the frontal end of the hollow cylinders penetrate the piece of foodstuff in a screw motion. The frontal end of the hollow cylinders forms a limit stop. The torque control ensures that the hollow cylinders are no longer driven to rotate, when the needles have already penetrated the piece of foodstuff. Due to the mutually interlaced position of the two needles, the piece of foodstuff sticks firmly to the gripper. In order to release the piece of foodstuff, the two hollow cylinders are rotated in the opposite direction.

According to yet another embodiment of the invention, the needle gripper consists of a first and a second gripper blocks that can be linearly moved towards each other or away from each other. One end of the needles is attached to the second gripper block and the needles are conducted in guide sleeves through the first gripper block. A driving mechanism firmly connected to the second gripper block moves the needle gripper to the piece of foodstuff to be picked up. A sensor measures the distance, by which the two gripper blocks are to be moved to each other. When the two gripper blocks approach each other, the needles pass through the guide sleeves and penetrate the surface of the foodstuff. Since the needles are mutually interlaced, the piece of foodstuff remains hanging on the needle gripper, when it is lifted together with the foodstuff. To release the piece of foodstuff, the two gripper blocks are moved away from each other. In this process, the needles withdraw out of the piece of foodstuff and back into the guide sleeves. The sensor allows to determine how deep the needles penetrate the foodstuff.

Further advantages and advantageous embodiments follow from the subsequent description, drawing and the claims.

BRIEF DESCRIPTION OF THE DRAWINGS

The drawing shows a design example of the invented device, which is explained in further text in more detail.

FIG. 3 shows a first version of a needle gripper in exploded view.

FIG. 4 shows the circular section of FIG. 3 marked with an A.

FIG. 5 shows a second version of a needle gripper in exploded view

FIG. 6 Section of the needle gripper as shown in FIG. 5

DETAILED DESCRIPTION OF THE INVENTION

Figure 1:
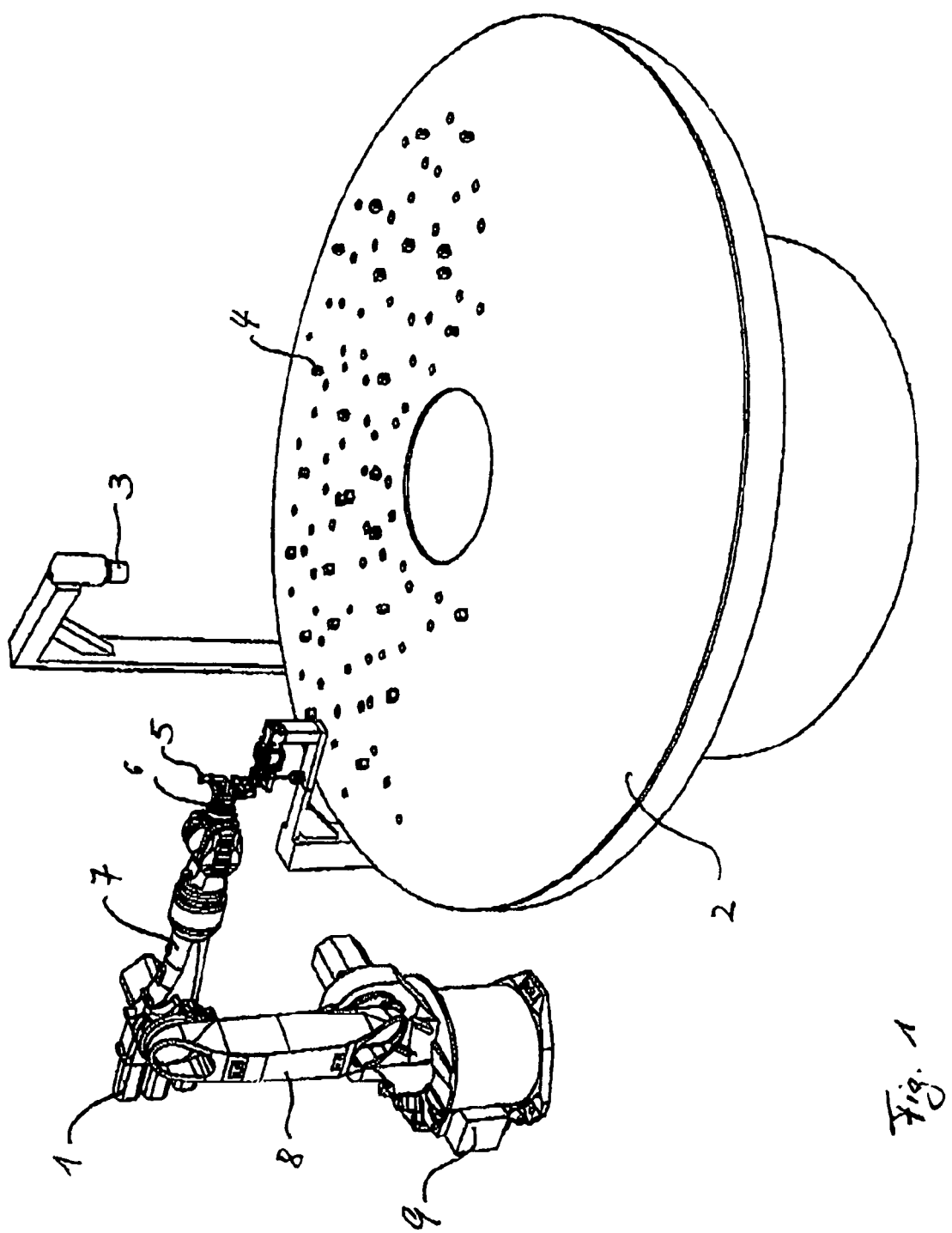
FIG. 1 shows a device for the preparation of shashlik-like brochette meals in exploded view.
Figure 2:
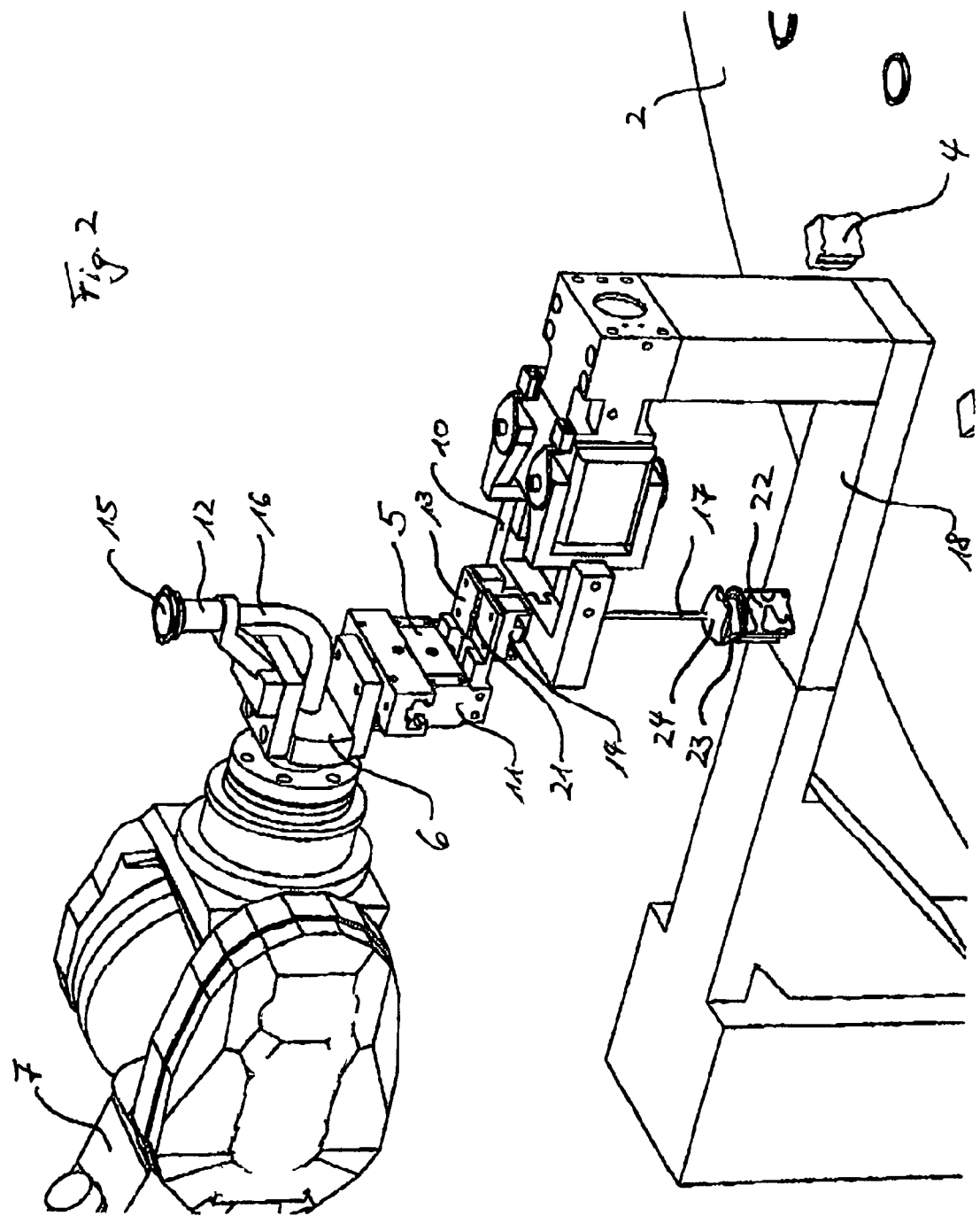
FIG. 2 shows A section of FIG. 2

FIG. 1 illustrates a device for the preparation of shashlik-like brochette meals with an industrial robot 1, a turnable table 2, and a device for image processing with a camera 3. Pieces of ingredients for the shashlik brochette lie on the turnable table 2. The camera 3 records the position and orientation of the pieces of ingredients 4. Using an image-processing unit, the recorded data is analyzed and transmitted to the industrial robot 1. The image-processing unit can have the form of a computer equipped with suitable software. The computer can also control the industrial robot by coordinating its movements with the data recorded with camera 3. The turnable table 2 supplies the ingredient pieces 4, recorded by camera 3, to the ingredient grippers 5 of the industrial robot 1. The ingredient grippers 5 are arranged on the turnable unit 6 of a movable arm 7 of the industrial robot. FIG. 2 shows the turnable unit and the ingredient grippers. The movable arm 7 is connected with a second movable arm 8. The two arms 7 and 8 as well as the turnable unit 6 and the ingredient grippers 5 are moved by the drive system 9. In this way, the ingredient grippers 5 can be transferred to the proximity of the ingredient pieces 4 lying on the turnable table 2.

FIG. 2 shows a section of FIG. 1. This illustration shows the turnable unit 6 with the ingredient grippers 5. Furthermore, the illustration shows the brochette gripper 10. A parallel gripper 11 and a suction gripper 12 are provided as ingredient grippers. The parallel gripper comprises two fingers 13 with claws 14 attached to them. A piece of ingredient 4, for example a piece of meat, is clamped between the two claws. To achieve this, the parallel gripper in open position is brought to the proximity of a piece of ingredient 4 lying on the table. Then the two fingers 13 are moved to each other so that the piece of ingredient 4 gets clamped between the two claws. The suction gripper 12 is equipped with a suction cup 15. An air pipe in the tube 16 (not shown in the picture) sucks off air from the suction cup 15. When the suction gripper 12 is moved into the proximity of the piece of ingredient 4 located on the turnable table, and the suction cup 15 is applied to the piece of ingredient 4, the piece of ingredient adheres to the suction gripper 12 due to the depression existing in the suction cup. The suction gripper 12 is suitable especially for pieces of green peppers, onion, and other vegetable and fruit.

On its bottom side, the brochette 17 is attached, through a hole, to the support 18. The hole is not visible in the drawing because it is covered by a piece of ingredient. The sharp end of the brochette 17 is held by the brochette gripper 10. In this case, it is an angle gripper. The two fingers 20 of the brochette gripper 10 clamp the sharp end of the brochette 17.

The filling of the brochette 17 with pieces of ingredients 4 proceeds as follows:

First, one of the ingredient grippers 4 is brought into the proximity of a piece of ingredient 4 located on the turnable table 2. The information for this movement is provided by a camera 3 and an image-processing device (not shown in the drawing). The ingredient gripper 5, for example, a parallel gripper 11, picks up a piece of ingredient 4, for example, a piece of meat, from the turnable table 2 and puts it to the sharp end of the brochette 17. The brochette gripper 10 opens and the parallel gripper 11 can then, unrestricted, push the piece of ingredient 4 all the way to the pre-determined position on the brochette 17. Then, the brochette gripper 10 closes and the parallel gripper 11 opens to release the piece of ingredient. The two fingers 13 comprise a recess 21, through which the brochette can extend during the shifting of the piece of ingredient along the brochette 17. The drawing shows a piece of meat 22, a piece of green pepper 23, and a piece of onion 24 already slipped on the brochette 17.

The pieces of ingredients picked up by the suction gripper 12 are only placed upon the sharp end of the brochette 17. The suction gripper does not ensure the shifting of the piece of ingredients to their pre-determined positions on the brochette 17. This occurs only through a subsequent piece of meat, which is shifted to its pre-determined position—together with the preceding pieces—by the parallel gripper 11.

In order to pick up the pieces of ingredients, the ingredient grippers 5 are moved to the proximity of the turnable table. The two ingredient grippers 5 can pick up pieces of ingredients before the movable arms 7 and 8 transfer the ingredient grippers 5 to the brochette 17. The turnable unit 6 turns to allow picking up various types of ingredients. In addition, there exists the possibility that each piece of ingredients is placed upon the brochette 17 by the ingredient gripper 5 immediately after having been picked up.

FIGS. 3 and 4 show a first design example of a needle gripper with two coaxially arranged hollow cylinders 25 and 26. The both hollow cylinders are driven to rotate in opposite directions. The inner hollow cylinder 25 is driven by a robot, to which the needle gripper can be attached with a robot attachment element 27. The robot itself is not shown in FIG. 3. It can be a robot as shown in FIG. 1. The outer hollow cylinder 26 is driven by an electric motor 28 and a transmission consisting of two cogged wheels 29 and 30. The frontal ends of the hollow cylinders 25 and 26 carry needles 31 that are inclined towards the frontal side. The needles of the inner hollow cylinder 25 are all inclined in one direction, whereas the needles of the outer hollow cylinder 26 are all inclined in the opposite direction. A tracer pin 32 is located, in coaxial arrangement in relation to the two hollow cylinders, inside the inner hollow cylinder. This tracer pin recognizes, when the needle gripper touches an object, for example, a piece of foodstuff. Depending on this recognition, the two cylinders are driven to rotate. The direction of rotation of the two hollow cylinders can be reversed. When picking up a piece of ingredient, the cylinders turn in one direction, when releasing it, they are turned in the opposite direction.

FIGS. 5 and 6 show a second design example of a needle gripper. The needle gripper consists of a first gripper block 33 and a second gripper block 34. Needles 35 are attached, at their upper end, to the second gripper block. They extend through the first gripper block in guide sleeves. Although the needle guide sleeves are contained in FIG. 6, they are not accurately illustrated. In order to make the front ends of the needles 35 that protrude from the first gripper block mutually interlaced, the needle guide sleeves have a curved shape. The flexible needles follow the course of the needle guide sleeves. FIGS. 5 and 6 show the needle gripper with its needles in extended position. In this position, a piece of foodstuff hanging on the needles can be transported. The needles are retracted into the first gripper block by distancing the first and the second gripper blocks from each other. Guide elements 36 are provided between the first and the second gripper block. The guide elements extend in a coil springs 37. The robot connection component 38 serves the purpose of attaching the needle gripper to the arm of a robot.

All features of the invention can be invention-relevant individually or in any combination.

LIST OF REFERENCE NUMBERS

1 Industrial robot
2 Turnable table
3 Camera
4 Piece of ingredient
5 Ingredient gripper
6 Turnable unit
7 Movable arm
8 Second movable arm
9 Drive system
10 Brochette gripper
11 Parallel gripper
12 Suction gripper
13 Fingers of the parallel gripper
14 Claws of the parallel gripper
15 Suction cup
16 Pipe
17 Brochette
18 Support
19
20 Finger of the brochette gripper
21 Recess
22 Piece of meat
23 Piece of green pepper
24 Piece of onion
25 Inner hollow cylinder
26 Outer hollow cylinder
27 Robot attachment element
28 Electric motor
29 Cogged wheel
30 Cogged wheel
31 Needle
32 Tracer pin
33 First gripper block
34 Second gripper block
35 Needle
36 Guide element
37 Helical spring

The invention claimed is:
1. Device for the preparation of brochettes filled with foodstuff, comprising
a brochette holder to hold a brochette,
a transport device to supply pieces of foodstuff, an optical sensor and an image-processing unit for determining the position of discrete pieces of food stuff to be gripped on the transport device, one or more ingredient grippers to pick up the pieces of foodstuff from the transport device, a control unit connected with the image-processing unit to control the ingredient grippers to position the grippers around a discrete piece of food stuff on the transport device.

2. Device according to claim 1, further comprising a retainer to hold the blunt end of the brochette.

3. Device according to claim 1, wherein as the brochette holder or in addition to the brochette holder, a brochette gripper is provided to hold and/or move the brochette.

4. Device according to claim 3, wherein a control unit is provided to control the brochette gripper.

5. Device according to claim 3, wherein the ingredient gripper and/or the brochette gripper comprise an angle or parallel gripper.

6. Device according to claims 1 wherein one or more molds are provided for placing and arranging the pieces of foodstuff.

7. Device according to claim 6, wherein the molds comprise guides for the brochette.

8. Device according to claim 1, further comprising guide plates to guide the brochette.

9. Device according to claims 1, wherein several ingredient grippers are mounted on a turnable unit of a movable arm of an industrial robot.

10. Device according to claim 9, wherein the ingredient gripper comprises an angle or parallel griper and the angle or parallel gripper comprises two fingers and a claw, mounted on each finger, to hold one piece of ingredient, and that each of the two fingers has a recess on a side facing the other finger, through which the brochette can be conducted during the filling with the pieces of ingredients.

11. Device according to claims 1, wherein the one or more ingredient grippers are arranged on a handling device that can be rolled or shifted linearly in two dimensions.

12. Device according to claim 11, wherein the handling device is arranged above the transport device.

13. Device according to claims 1, wherein the transport device comprises several conveying belts running parallel to each other.

14. Device according to claims 1 a suction gripper is provided as the ingredient gripper.

15. Device according to claims 1 wherein the ingredient gripper is a needle gripper.

16. Device according to claim 15, wherein the needle gripper comprises at least two hollow cylinders in coaxial arrangement in relation to each other, that one or more rotation drives are provided to rotate the hollow cylinders in opposite directions around a common axis, that a linear drive is provided to linearly shift the cylinders in the direction of their common axis, that needles are provided arranged on the frontal side of the hollow cylinders, the needles being inclined towards the frontal side, and that the torque of the rotation drive(s) of the hollow cylinders is controlled.

17. Device according to claim 16, wherein a robot is provided for the linear drive and one of the rotation drives.

18. Device according to claim 17, wherein an additional motor with torque control is provided as the second rotation drive, while its control is connected to the robot control.

19. Device according to claim 15, further comprising a first and a second gripper block, guide elements rigidly connected to the first gripper block and conducted through the second gripper block in a shiftable way, one or more springs installed between the two gripper blocks, needles attached with one end in the second gripper block and are conducted through needle guide sleeves of the first gripper block, a drive rigidly connected to the second gripper block to move the device into the proximity of a piece of foodstuff to be picked up, and a sensor, arranged on the second gripper block or on one of the guide elements, to measure the distance by which the two blocks must be moved to each other.

20. Device according to claim 19, further comprising a control of the drive that receives the distance measured by the sensor as the input data.

21. Device according to claims 1 wherein a camera is provided as the optical sensor.

\* \* \* \* \*